United States Patent [19]

Ichikawa

[11] Patent Number: 6,013,403
[45] Date of Patent: Jan. 11, 2000

[54] DIGITAL IMAGE FORMING METHOD AND APPARATUS

[75] Inventor: Junichi Ichikawa, Ebina, Japan

[73] Assignee: Fuji Xerox Co., Ltd., Tokyo, Japan

[21] Appl. No.: 09/137,114

[22] Filed: Aug. 20, 1998

[30] Foreign Application Priority Data

Sep. 10, 1997 [JP] Japan ................................. 9-245467

[51] Int. Cl.$^7$ ................................................ G03G 13/045
[52] U.S. Cl. ................................................ 430/97; 399/49
[58] Field of Search ............................. 399/49; 430/126, 430/54, 120, 97

[56] References Cited

U.S. PATENT DOCUMENTS 5,305,057  4/1994  Hattori et al. ........................... 355/203
5,372,906  12/1994  Haneda et al. .......................... 430/126

FOREIGN PATENT DOCUMENTS

| 52-147444 | 12/1977 | Japan . |
|---|---|---|
| 58-162970 | 9/1983 | Japan . |
| 62-89073 | 4/1987 | Japan . |
| 62-90679 | 4/1987 | Japan . |
| 1-297675 | 11/1989 | Japan . |
| 2-2613649 | 2/1997 | Japan . |

*Primary Examiner*—John Goodrow
*Attorney, Agent, or Firm*—Oliff & Berridge, PLC

[57] ABSTRACT

When the uniformly charged surface of a photoreceptor is exposed to an intensive light (a), a potential at an exposed position (Vx) is lower than a bias voltage (Vbias-A) of a first developing unit (b), toner A attaches to the exposed position (Vx) after its developing process, and its potential is lower than a bias voltage (Vbias-B) of a second developing unit (c). When the uniformly charged surface of a photoreceptor is exposed to a weak light, a potential at the exposed position (Vx) is lower than the bias voltage (Vbias-B) but higher than the bias voltage (Vbias-A) (e). Only toner B attaches to the photoreceptor (f). If the toner A and toner B belong to the same color family and are black toner and gray toner, an image of two density levels is formed, and the gradation and the graininess of the resultant picture are improved.

6 Claims, 10 Drawing Sheets

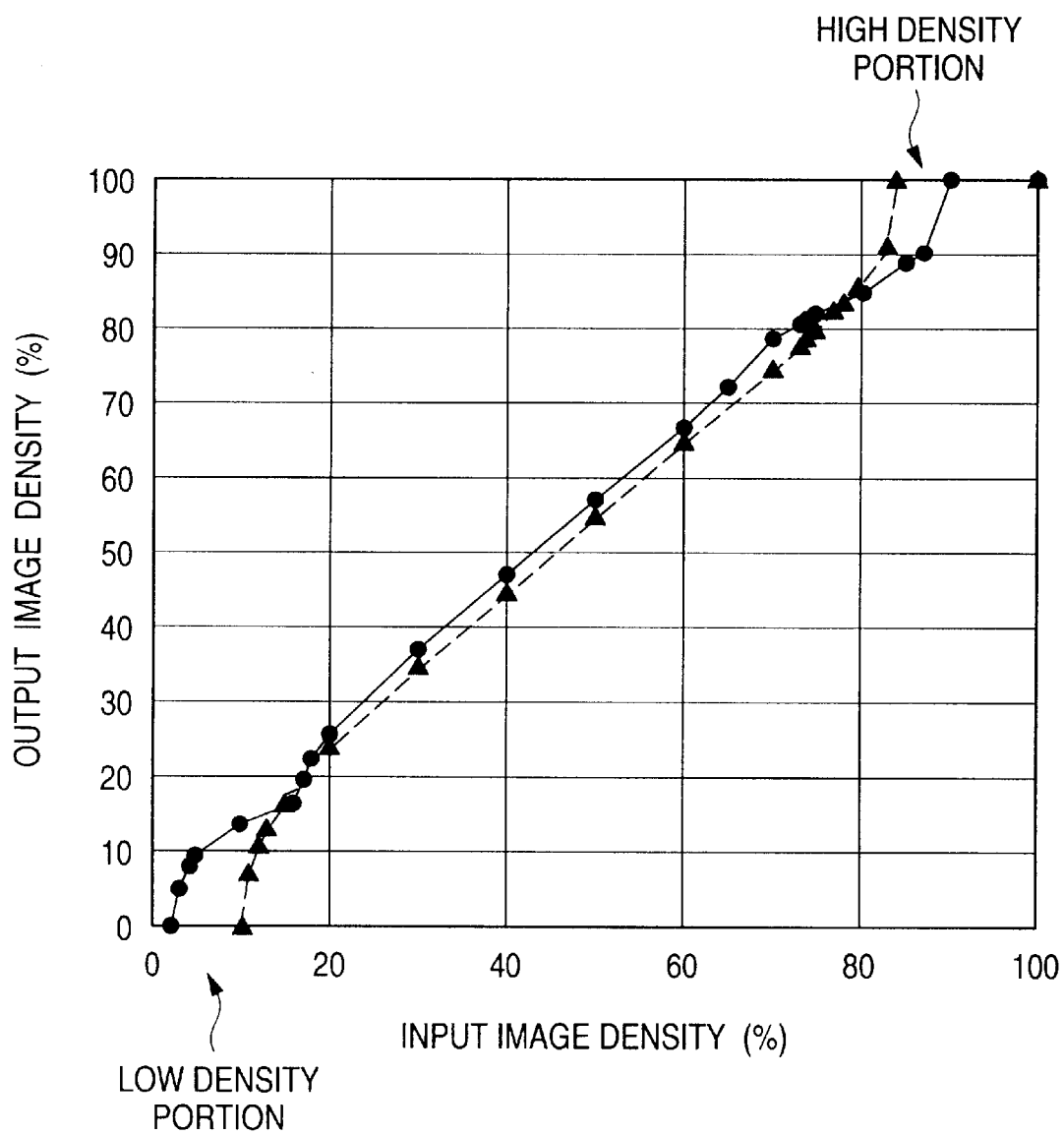

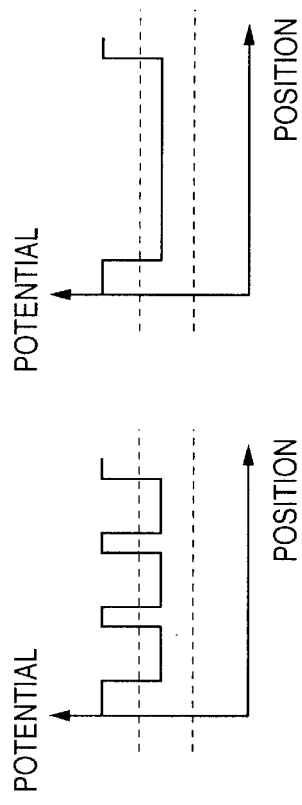
FIG. 7B Cin21
FIG. 7C Cin42
FIG. 7D Cin63
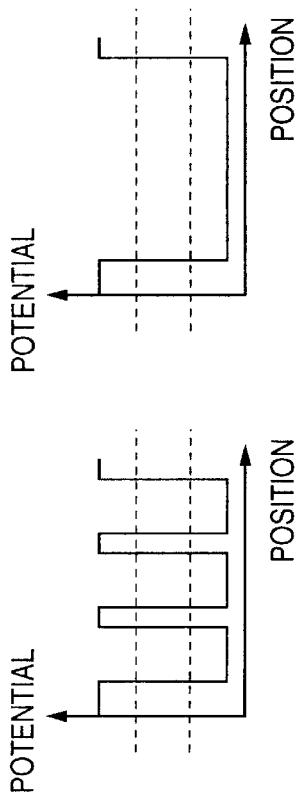
FIG. 7E Cin64
FIG. 7F Cin160
FIG. 7G Cin255
FIG. 7A Cin0

DIGITAL IMAGE FORMING METHOD AND APPARATUS

BACKGROUND OF THE INVENTION

The present invention relates to a method and apparatus for forming an image by a digital technology. More particularly, the invention relates to an image forming apparatus, e.g., a printer or a digital copying machine, which uses the image forming method and apparatus to improve the gradation and graininess of a half-tone image, e.g., a xerographic image, by use of toner particles of dark color and light color.

In an image forming apparatus, such as a laser beam printer, a digital copying machine, or a facsimile machine, to the primary scan, a light beam, e.g., a laser beam, emitted from a semiconductor laser device, for example, is deflected in a predetermined direction by means of a rotating polygon, e.g., a polygon mirror, and to the secondary scan, a photosensitive member, i.e., a photoreceptor, is moved in the direction perpendicular to a predetermined direction on the image plane of the photoreceptor with respect to the light beam reflected by the polygon mirror or the light beam is deflected by an element, e.g., a galvano mirror. A scan speed is corrected by a fθ lens, for example, and the photoreceptor is two-dimensionally exposed to the light beam. The light beam is on/off controlled or interrupted in synchronism with the primary and secondary scanning motions, whereby an image is formed on the photoreceptor (the surface of the photoreceptor is imagewise exposed to the light beam). In other words, the uniformly charged surface of the photoreceptor is exposed to the light beam whose light amount is varied in accordance with optical densities of an image to be recorded or printed on the photoreceptor. As a result, the charge is removed from the photoreceptor surface in accordance with the optical densities of the image, to thereby form an electrostatic latent image on the photoreceptor surface. Then, toner particles are attached to the latent image thus formed on the photoreceptor surface.

A recent market in this field demands the improvement of the print quality of a half-tone image like as the images of characters and lines as binary images of black and white. A half-tone image forming apparatus is known in which the on- and off-times (durations) of the light beam moved at a constant speed in the primary scan direction, are controlled (the apparatus is based on the light-emission-time-duration control, or pulse width modulation method). More exactly, to form a half-tone image, the size of each dot to be printed is controlled by varying an amount of light beam (light emitting time X light intensity). In this case, to vary the amount of the light beam, the pulse width (light emission time) of the light beam or an intensity of light beam is varied.

Two methods are known to form a full color image by a xerography process. A first xerography-basis image forming method follows: a toner image is formed on the surface of a photoreceptor through a process of charging, exposure and development; the toner image is transferred onto a printing paper electrostatically attracted on the intermediate image transfer member; the image forming process and the image transferring process are sequentially repeated a plural number of times to form a full color toner image on the printing paper; and finally the color toner image is thermally fuzed and fixed onto the paper. A second xerography-basis image forming method uses xerography engines (each including photoreceptor, charging means, exposing means, developing means and image transferring means) whose number is equal to the number of colors of toner particles. The second method is capable of forming a multi-color image without reducing the printing speed even if the number of toner colors is increased. Thus, in the second method, the printing speed is not reduced if the number of toner colors is increased, but the apparatus size is increased since the number of xerography engines is increased.

The human eyes are sensitive to a minute variation (gradation) of optical density and the texture of grains (graininess) particularly in a high light portion of low density, e.g., skin color. For this reason, to improve the print quality of the half-tone image, it is necessary to improve the gradation and the graininess in the high light portion.

There are proposed techniques to form the half-tone image of the improved print quality (the Unexamined Japanese Patent Application Publication No. Sho 52-147444 and 58-162970). The first technique is that two kinds of toner particles which are equal in polarity but different in color are mixed in a state that their tribocharge amounts are different, and an electrostatic latent image, after formed, is developed using those kinds of toner particles to form an image of a multiple of colors. The second technique is that different kinds of toner particles which are different in density and electric resistance are mixed, and an electrostatic latent image, after formed, is developed using those kinds of toner particles, to produce a toner image of a reduced γ-characteristic, or a half-tone image excellent in gradation. In those proposals, it is necessary to use the number of kinds of toner particles, which depends on the number of colors and gradation levels. This results in complexity and increase of size.

To produce a half-tone image at a desired density, a technique to set a ratio of the amount of black toner to the amount of the whole toner in accordance with a document density and a developing potential (reference is made to the Japanese Patent No. 2613649 corresponding to the Unexamined Japanese Patent Application Publication No. Hei 2-287370). Two kinds of developers (a developer for gradation which contains small amount of carbon black for gradation and a developer for high contrast which contains large amount of carbon black) are contained in separate developing units. To develop, one of the developing units is selected according to an instruction by an operator, which depends on the kind of document to be reproduced (the Unexamined Japanese Patent Application Publication No. Hei 1-297675). In the technique, it is necessary to set the toner amount ratio in accordance with a density of the half-tone image, and to change the setting in accordance with the type of document to be reproduced. In other words, the apparatus operation is complicated.

Another technique is disclosed in the Unexamined Japanese Patent Application Publication No. Sho 62-89073 and Sho 62-90679. In the technique, two kinds of developers (one developer containing black toner and the other containing gray toner) which are equal in hue but different in color tone are contained in separate developing units. A uniform exposure unit is disposed between the two developing units. An electrostatic latent image, after formed, is developed by use of those developers. More exactly, the uniformly charged photoreceptor is exposed to a light beam containing image information to thereby form an electrostatic latent image. The latent image is developed by use of the developing unit containing black toner, and the toner image is subjected to a uniform exposure by the uniform exposure unit. Thereafter, the toner image uniformly exposed is developed again by use of the developing unit containing gray toner. The resultant toner image accrues to a reproduced picture excellent in gradation. Specifically, the formation of an electrostatic latent image is performed in a state that a latent image potential in the white portion is increased by slightly reducing a light amount of the light beam. A latent image, after formed, is developed by the first developing unit, and subjected to a uniform exposure by the uniform exposing process, and the thus uniformly exposed latent image is developed by the second developing unit. At this time, the amounts of black toner and gray toner attached to the latent image or of the toner image are different from each other. The toner amount difference causes a potential difference between the latent image, and in turn a gradation difference of the image in level. In the technique, the uniform exposure process is essential and hence this makes the apparatus construction complicated.

SUMMARY OF THE INVENTION

Accordingly, an object of the present invention is to provide a digital image forming method which improves the gradation and the graininess of a half-tone image by use of toner of dark color and toner of light color.

Another object of the present invention is to provide a digital image forming apparatus for executing the above method.

To achieve the above object, there is provided a digital image forming method for forming a digital image by developing an electrostatic latent image including a plural number of latent-image pixels on a photosensitive member, the method comprising the steps of:

forming latent-image pixels by varying the potential of the latent image in accordance with image information representative of gradation levels; and developing the latent image by use of toner particles of gradation levels corresponding to the varied potentials of the latent image.

In the invention thus constructed, plural kinds of color toner of different color densities, for example, are used. A marked toner is selected from among those toner by varying the potential of the electrostatic latent image. The latent image is developed with the toner selected in accordance with an exposure light intensity, for example. Those kinds of color toner belong to the same color family but is different in color density, whereby the gradation of the half-tone image is improved.

The principle to develop the electrostatic latent image with plural kinds of color toner while taking the exposure light intensity into consideration will be described with reference to FIGS. 1A to 1F. An example in which the potential of an electrostatic latent image of one pixel is varied for development will be used for the description. FIG. 1A shows a variation of the potential on the photosensitive member or photoreceptor uniformly charged. FIGS. 1A to 1D show a developing process when the photoreceptor is exposed to an exposure light of high intensity. In those figure, Vbias-A is a bias voltage applied when a first toner (toner A) of a gradation level is used for development. Vbias-B is a bias voltage applied when a second toner (toner B) of a gradation level, different from that of the toner A. When Vbias-A<Vbias-B, the development by the toner A needs a higher exposure light intensity than the development by the toner B. FIG. 1B shows a potential distribution on the photoreceptor after the photoreceptor is exposed to an intensive light for the development by the toner A. As shown, the potential at the exposed position Vx is lower than Vbias-A. FIG. 1C shows a potential distribution on the photoreceptor after the pixel at the FIG. 1B potential is developed with the toner A. A region (the exposed position Vx on the photoreceptor) whose potential decreases below Vbias-A as the result of exposure is developed with the toner A. The potential of the toner image resulting from the development by the toner A is lower than the bias voltage Vbias-B. Therefore, the region attached with the toner A is also developed with the toner B when the development by the toner B is performed. The result is that the toner A and the toner B are superposed one on the other in the final toner image (both toner particles are attached to the region).

FIGS. 1E and 1F show a developing process when the photoreceptor is exposed to an exposure light of weak intensity. The potential on the photoreceptor is lower than Vbias-B but higher than Vbias-A. Therefore, the toner A to be attracted by the bias voltage Vbias-A does not contribute to the developing process. In the developing-process by the toner B, the potential on the photoreceptor is lower than Vbias-B, so that only the toner B is attached to the photoreceptor as shown in FIG. 1F.

It is assumed that the toner A and the toner B belong to the same color family, and the toner A is a dark color toner of high color density and the toner B is a light color toner of low color density. If so, in a state that the two toner particles are superposed on the photoreceptor as shown in FIG. 1D, the density of the toner A is predominant and satisfactorily high. The influence by the toner B of low color density is negligible on the photoreceptor. As a consequence, an image of two levels of density can be developed according to the principle illustrated in FIG. 1, whereby the graininess of a half-tone image can be improved by use of the dark color toner and the light color toner.

In the above description, the threshold value of the exposure energy for development is expressed in terms of the bias voltage, but actually, the development threshold value sometimes shifts from the bias voltage.

BRIEF DESCRIPTION OF THE DRAWINGS

FIG. 5 is a graph showing the improvement of the gradation, made by the image forming apparatus.

FIGS. 7A to 7G are a set of graphs showing a developing process of the invention when an intensity modulation and a pulse width modulation are combined.

DETAILED DESCRIPTION OF THE PREFERRED EMBODIMENTS

An embodiment of the present invention will be described with reference to the accompanying drawings. In a preferred embodiment of the invention, the invention is incorporated into an image forming apparatus operating as follows: the uniformly charged surface of a photoreceptor is exposed to and scanned with a light beam containing image data to form an electrostatic latent image thereon. The latent image is developed with toner particles to form a toner image on the surface of the photoreceptor. The toner image is transferred from the photoreceptor onto an image recording or permanently storing medium, e.g., a recording or printing paper. The transferred toner image is fuzed and fixed onto the printing paper.

Figure 2:
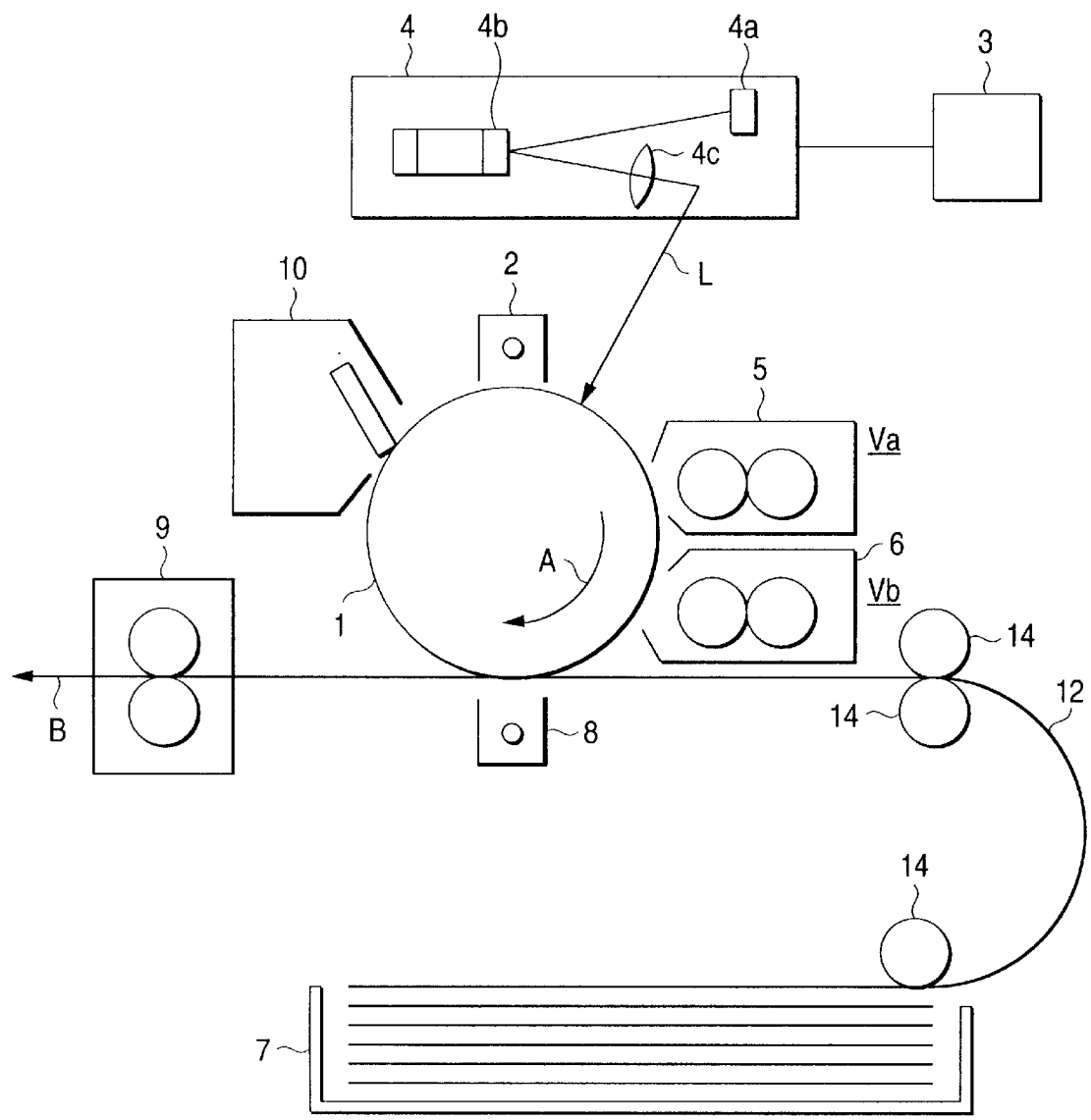
FIG. 2 is a schematic diagram showing the construction of an image forming apparatus constructed according to the present invention.

Reference is made to FIG. 2. As shown, the image forming apparatus which constitutes the embodiment of the invention includes a photoreceptor 1 which rotates in a predetermined direction (of an arrow A in FIG. 2). A charging unit 2 for uniformly charging the surface of the photoreceptor 1 is disposed at a given position close to the surface of the photoreceptor 1. A first developing unit 5, a second developing unit 6 and an image transferring means 8 are located downstream (when viewed in the rotating direction of the photoreceptor 1) of the charging unit 2 around the photoreceptor 1. A cleaning means 10 is disposed downstream (when viewed in the photoreceptor rotating direction) of the image transferring means 8. The cleaning means 10 removes toner that is left on the photoreceptor 1 after the image transferring by the transferring means 8. A fixing unit 9 is located downstream of the transferring means 8 when viewed in the advancing direction (of an arrow B in FIG. 2) of a printing paper 12. A transporting roller pair 14 is located upstream (when viewed in the paper advancing direction) of the transferring means 8. A paper tray 7 containing a stack of printing papers 12 is located upstream of the transporting roller pair 14.

An exposure unit 4 hits a region of the surface of the photoreceptor 1, which is located between the charging unit 2 and the first developing unit 5, with a light beam L. The exposure unit 4, connected to an image processor unit 3, scans the surface of the photoreceptor 1 with the light beam L in a given direction (vertical to the surface of the drawing of FIG. 2), while turning on and off a light source contained therein in accordance with image data output from the image processor unit 3. In other words, the surface of the photoreceptor 1 is dynamically exposed to the light beam containing image data.

The surface of the photoreceptor 1 is uniformly charged by the charging unit 2, and scanned with the light beam that is emitted from the exposure unit 4 after it is modulated by the image data output from the exposure unit 4. The positions of the surface of the photoreceptor 1 that are exposed to the light beam are discharged to form an electrostatic latent image, and the latent image is developed with toner particles that are supplied from the first developing unit 5 and the second developing unit 6, to form a toner image. The toner image is transferred onto the printing paper 12 by the transferring means 8. The printing paper 12 is supplied from the paper tray 7. The printing paper 12 bearing the toner image formed thereon is heated and fuzed by the fixing unit 9 to be fixed onto the printing paper 12. After the image transferring by the transferring means 8, toner particles that are left on the surface of the photoreceptor 1 are removed therefrom by the cleaning means 10.

Different kinds of toner particles which belong to the same color family but different in density are contained in the first developing unit 5 and the second developing unit 6. The toner particles contained in the first developing unit 5 are toner particles of high color density (black in this embodiment). The toner particles contained in the second developing unit 6 are toner particles B of low color density (gray in this embodiment). Toner particles of different color densities are formed by varying the amount of coloring material, e.g., carbon black, contained in a base material of transparent resin, e.g., styrene acryl or polyethylene, of the toner particles. A bias voltage Va applied to the first developing unit 5 is set to be lower than a bias voltage Vb applied to the second developing unit 6 (so that a high exposure level is required).

Figure 1A:
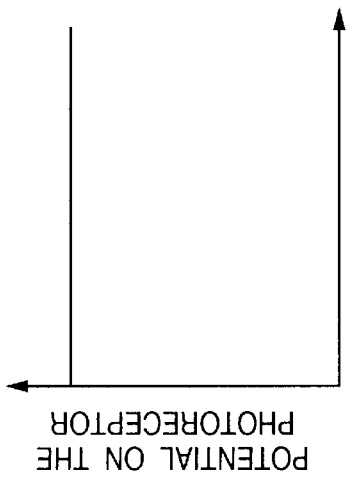
FIGS. 1A to 1F are graph useful in explaining the developing process carried out by the invention.
Figure 1B:
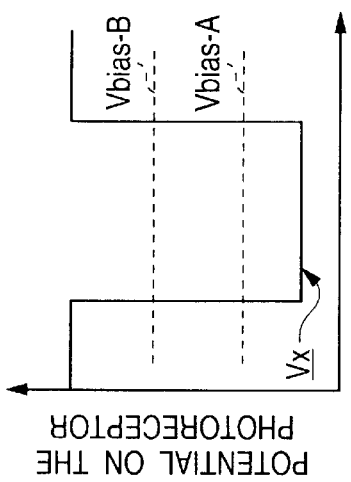
Figure 1C:
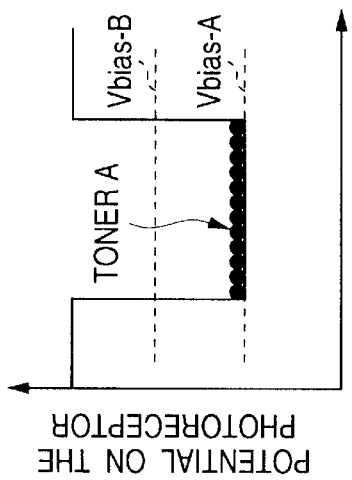
Figure 1D:
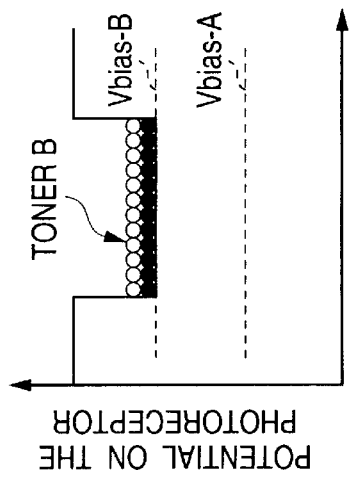

The constructed image forming apparatus of the embodiment can selects a toner of a medium density from among a plural kinds of toner in accordance with an exposure level. As already described in the "Means to Solve the Problems", the principle of the invention is: the photoreceptor 1, when charged by charging unit 2, has a uniform distribution of potential over its surface (FIG. 1A; At a high exposure level, the potential (Vx in FIG. 1) at the exposed position on the photoreceptor 1 is lower than a bias voltage Va (Vbias-A in FIG. 1) applied to the first developing unit 5 (FIG. 1B). The toner A is attached to the exposed position (Vx) of the photoreceptor 1 after it is processed by the first developing unit 5, and the potential thereat is lower than a bias voltage Vb (Vbias-B in FIG. 1) applied to the second developing unit 6 (FIG. 1C). The toner A attached position (Vx) is developed by the second developing unit 6 when it passes the second developing unit 6, and the toner B is attached to the position (Vx). Thus, the toner A and the toner B are attached onto the position (Vx) in a superposed fashion (FIG. 1D).

As already referred to, the toner A and the toner B belong to the same color family but are different in color density (the black toner of high color density and the gray toner of low color density). Therefore, in a state that the two kinds of toner, toner A and toner B, are superposed one upon the other (FIG. 1D), the density of the resultant image is satisfactorily high because of the presence of the toner A while being affected by the toner B of low color density superposed on the toner A.

Figure 1E:
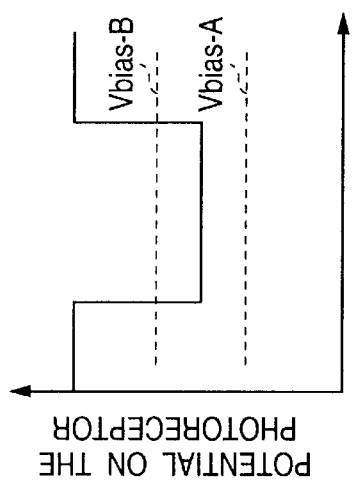
Figure 1F:
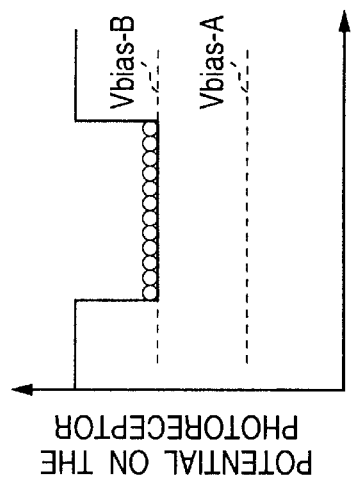

The potential at the position on the photoreceptor 1 which was exposed at a low exposure level is lower than the bias potential Vb (Vbias-B in FIG. 1) but higher than the bias potential Va (Vbias-A) (FIG. 1E). Therefore, the exposed position on the photoreceptor 1 is not developed by the first developing unit 5 containing the toner A when it passes the developing unit; however, it is developed by the second developing unit 6 containing the toner B (FIG. 1F).

Thus, the toner A and the toner B belong to the same color family but are different in color density (the black toner of high color density and the gray toner of low color density). With use of such color toner, even if the toner A and the toner B are superposed one upon the other as shown in FIG. 1D, the density of the resultant image is satisfactorily high because of the presence of the toner A while being affected by the toner B of low color density superposed on the toner A. Therefore, the images of two density levels can be developed and the gradation and the graininess of a half-tone image are improved by use of the two kinds of toner which are equal in color but different in color density (black toner and gray toner).

Figure 3:
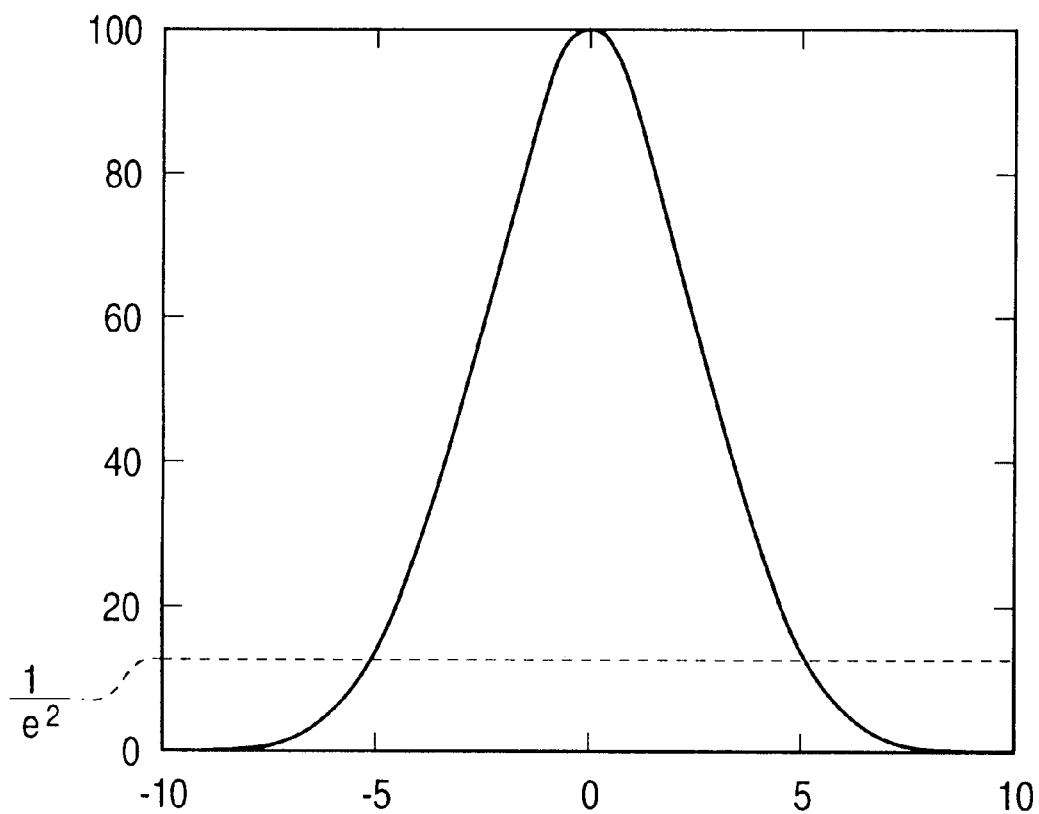
FIG. 3 is a graph showing an intensity distribution of a light spot of a light beam emitted from a laser scanner.

The exposure unit 4 of the embodiment is a general laser beam scanner. In the scanner, a light beam is emitted from a laser light source 4a and reflected by a polygon mirror 4b, and the reflected beam is transformed into a light spot on the surface of the photoreceptor 1, and the light spot is moved in the direction (main or primary scan direction) perpendicular to the moving direction of the photoreceptor 1 (viz., the photoreceptor surface is scanned with the light spot). The light intensity of the beam spot has a Gaussian distribution in cross section as shown in FIG. 3. The diameter of the beam spot (beam diameter) is defined by the width of the light intensity $1/e^2$ (13.5% indicated by a dotted line in the figure) as large as the general peak intensity of light.

In the xerography-basis image forming apparatus, it is a common practice that to form the half-tone image, a dot screen or a line screen is formed by varying the on-time (pulse width) of the light beam. Therefore, the basic pixel size is determined by the number of lines of a screen. In an example of 200 lines/inch, the basic pixel size is 127 μm (=25.4 (mm)/200).

Figure 4A:
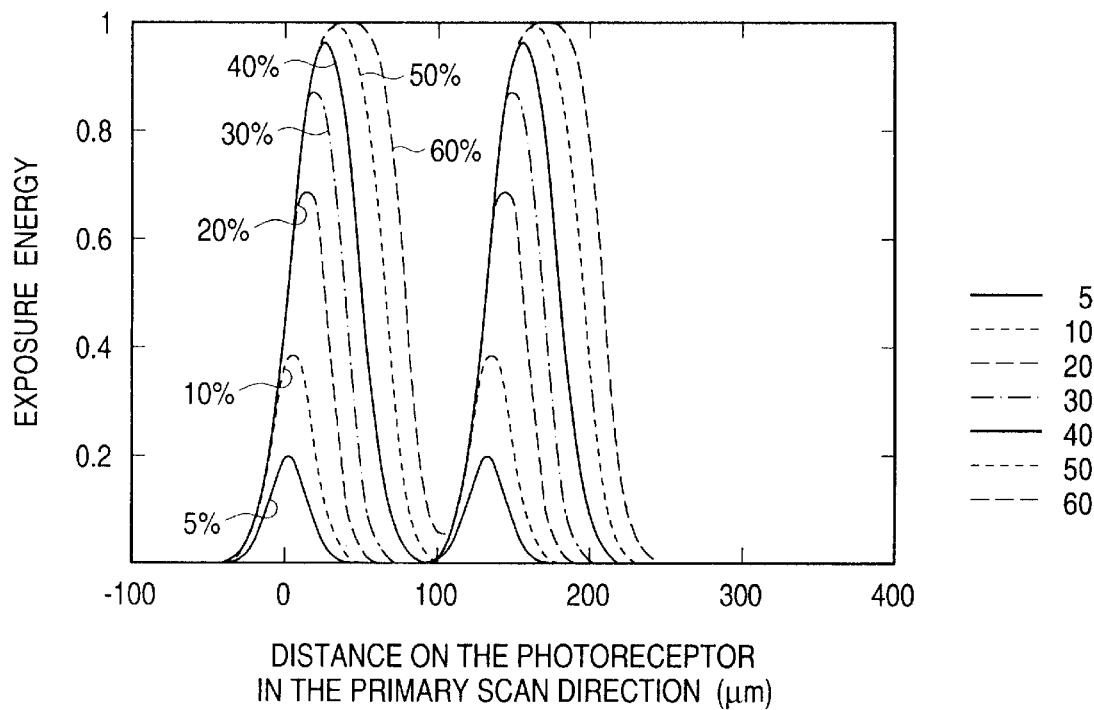
FIGS. 4A and 4B graphically show exposure energy distributions when the photoreceptor is exposed to and scanned with pulse width modulated light spot.
Figure 4B:
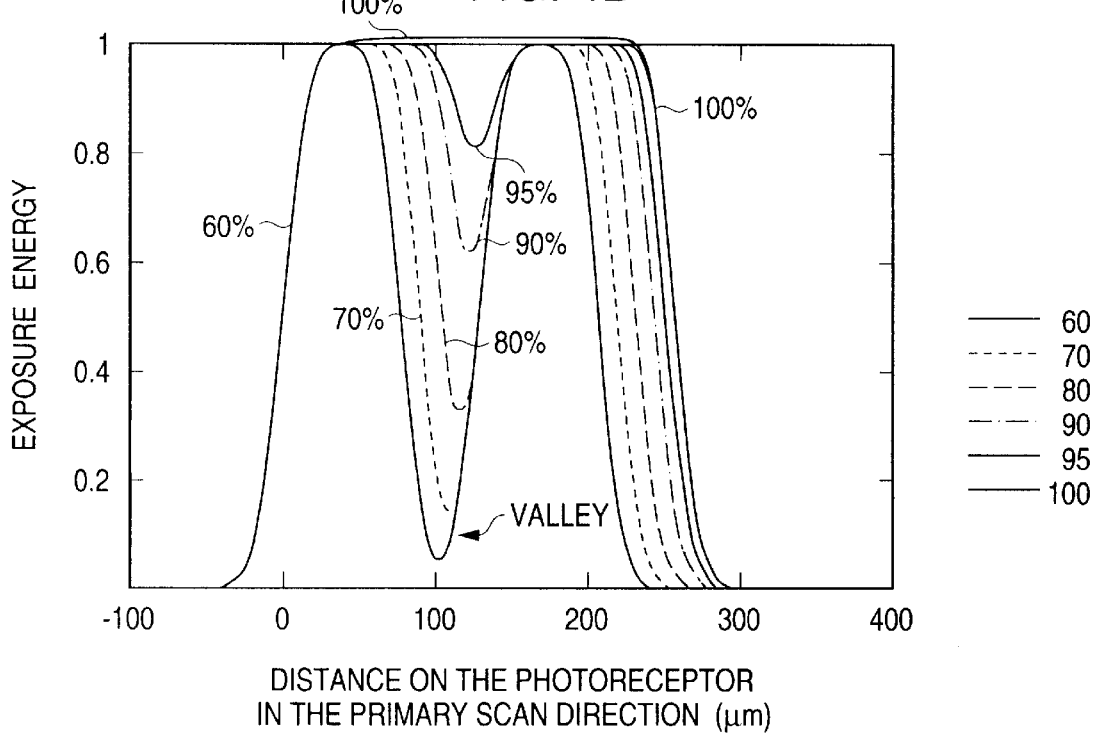

FIG. 4 is a graph showing an exposure energy distribution in the case of the exposure of two adjacent pixels, the distribution extending over a distance on the photoreceptor which extends in the primary scan direction, with a parameter of the modulation pulse width of the light beam. The beam diameter of the beam spot is 50 μm, and the beam spots are arrayed at the screen intervals of 200 lines. Exposure energy distribution curves of different parameter values (varied pulse width values) are illustrated in FIG. 4. FIG. 4A shows the exposure energy distribution curves depicted when the on-time of the light beam or the modulation pulse width is varied to 5, 10, 20, 30, 40, 50 and 60% (100%=the full pulse width), and FIG. 4B shows the exposure energy distribution curves depicted when the on-time of the light beam or the modulation pulse width is varied to 60, 70, 80, 90, 95 and 100%. As seen from FIG. 4A, when the beam diameter is 50 μm, the on-time must be 50% or larger till the peak value of the exposure energy is saturated. As seen from FIG. 4B, the exposure energy in a region or valley (a space of the beam interruption) between the adjacent two peaks in the exposure energy distribution curve increases in the region ranging from 60% or larger of the pulse width. In the subsequent description, the valley region between the adjacent peaks in the exposure energy distribution curve will be referred to sometimes as an "intermediate exposure region".

The improvement of the gradation of an image formed by the image forming apparatus of the embodiment under discussion is quantitatively illustrated in FIG. 5. In the graph of FIG. 5, the abscissa represents an image density (%) output from the image processor unit 3 and input to the image forming apparatus, and the ordinate represents an image density (%) output from the image forming apparatus. In FIG. 5, black dots (●) show the results of calculations conducted on the presumption that in the exposure energy distribution curves in FIGS. 4A and 4B, regions where the exposure energy exceeds the threshold values of the developing units are developed. Calculation conditions were: the beam diameter was 50 μm; the basic pixel size was 127 μm (200 lines/inch); the exposure energy (referred to as a development threshold value) required for the development by the first developing unit 5 was 0.6 in FIG. 4; the development threshold value of the second developing unit 6 was 0.1 in FIG. 4; a color density of the dark color toner was 100%; a color density of the light color toner was 40%; and a color density is invariable at 100% if the light color toner is superposed on the dark color toner as in the case of FIG. 1D. A gradation curve connecting black A, produced by operating a conventional image forming apparatus under the conditions that the development threshold value is 0.4 and only the dark color toner is used is illustrated in FIG. 5 for comparison with that by the invention. As seen from the FIG. 5 graph, the reproduction width is increased in both the high and low color density regions. This fact implies the improvement of the gradation in the reproduced image.

Figure 6:
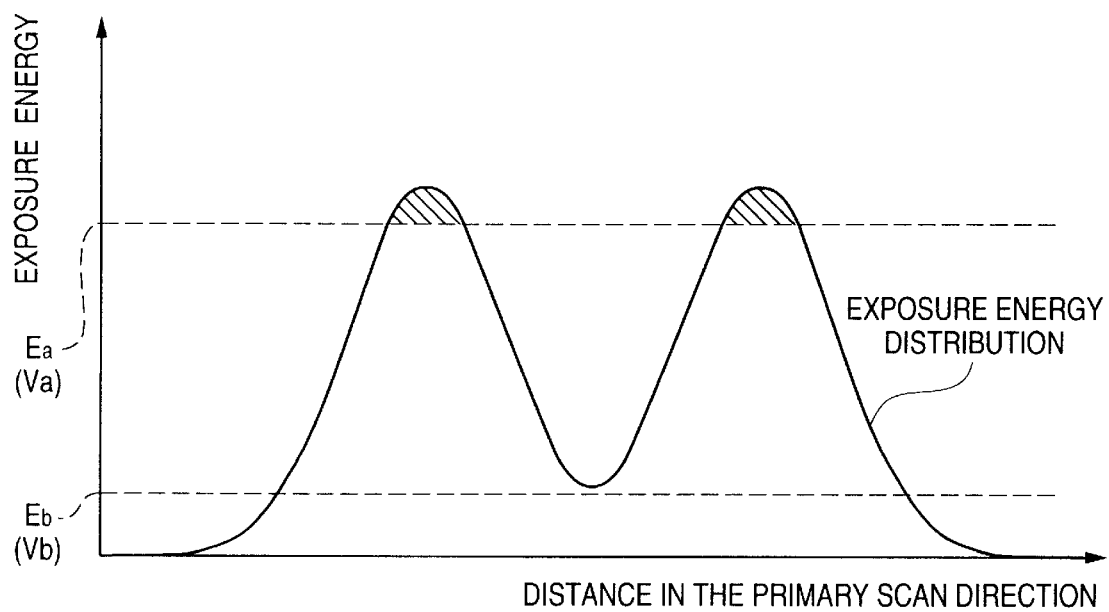
FIGS. 6 is a graph useful in explaining the relationship between the beam diameter and the development threshold value.

As shown in FIG. 6, when the exposure energy is below the threshold value of the first developing unit 5 but above the bias voltage (corresponding to Vb) applied to the second developing unit 6, only the light color toner particles attach to the latent image. When an image density of an image to be formed exceeds a predetermined value, viz., the exposure energy exceeds the threshold value of the first developing unit 5 (exposure energy Ea:correspond to the bias voltage Va applied to the first developing unit 5), the dark color toner particles attach to the regions (shaded portions in FIG. 6) in the vicinity of each peak in the exposure energy distribution. After the developing process, the gradation curve is sometimes discontinuous in a region where an image density of the developed image exceeds a predetermined value. As a result, a medium density curve is sometimes discontinuous.

From this fact, the inventor found that there is a correlation between the development threshold values of the first and second developing units 5 and 6 and the beam diameter. The image forming apparatus was operated under the following conditions that the beam diameter was 100 μm, the development threshold value (Ea) of the first developing unit 5 was set at 0.7, and the development threshold value (Eb) of the second developing unit 6 was set at 0.1, and then we have the following results. At both two input image densities, 36% and 41%, the exposure energy in the valley region in the exposure energy distribution exceeds the development threshold value of the second developing unit 6 and the peak of the exposure energy is below the development threshold value of the first developing unit 5. Therefore, the image density is little varied although the input image density difference is 5%. When the input image density exceeds 41%, the dark color toner particles attach to the regions in the vicinity (slanted regions in FIG. 6) of the peaks in the exposure energy distribution, to thereby develop those regions. The gradation curve is greatly discontinuous to unsmoothen the medium density variation.

To remove the discontinuity in the gradation curve, it is desirable to set the development threshold value or the beam diameter of the light spot so that the peak value in the exposure energy distribution reaches the development threshold value of the first developing unit 5 when or before the exposure energy in the valley region in the exposure energy distribution is substantially equal to the development threshold value of the second developing unit 6.

To be more specific, it is preferable to set the developing conditions or the spot diameter of the light spot so that when or before the exposure energy in the intermediate exposure region, i.e., the valley region in the exposure energy distribution is substantially equal to the minimum exposure energy necessary for developing process by the second developing unit 6 located farther from a position (located downstream when viewed in the rotation direction of the photoreceptor 1) near the position irradiated with the light beam emitted from the exposure unit 4, the peak value in the exposure energy distribution reaches the minimum exposure energy necessary for the developing process by the first developing unit 5 closer to the exposure unit 4 (located upstream when viewed in the rotation direction of the photoreceptor). If so set, a smooth variation of the medium density is secured without producing a large discontinuity in the gradation curve.

In the above description, the medium exposure energy is obtained by the utilization of the intermediate exposure region, which is produced with the pulse width modulation. The medium exposure energy may also be obtained by the utilization of an intensity modulation which modulates an intensity of light output from the light source. This will be described hereinafter.

Models of potential variations on the photoreceptor when the intensity modulation and the pulse width modulation are combined are illustrated in FIGS. 7A to 7G. In each of those figures, the ordinate represents a variation of the input image density, and the abscissa represents positions on the photoreceptor 1. The input image density varies as shown in FIGS. 7A to 7G. The input image density is represented by Cin. Numeral "255" indicates 100% of the input image density. Cin is followed by a numeral representing an image density.

In the range of the input image densities of FIGS. 7B to 7D (Cin0 to Cin63 (24.7%), the exposure unit 4 irradiates the surface of the photoreceptor 1 with an optical output (exposure energy), which is smaller than the development threshold value of the first developing unit 5 but larger than the development threshold value of the second developing unit 6. Therefore, the latent image on the photoreceptor 1 is developed with the light color toner particles till the input image density reaches Cin63.

In the range of the input image densities of FIGS. 7E to 7G, which are in excess of Cin63, the exposure unit 4 irradiates the surface of the photoreceptor 1 with an optical output power (exposure energy), which is larger than the development threshold value of the first developing unit 5. Therefore, the latent image on the photoreceptor 1 is developed with the dark color toner particles in the input image densities larger than Cin64. Thus, the combination of the pulse width modulation means and the intensity modulation means capable of modulating an optical output power in an intensity level equal to or higher than the number of developing units also enables use of the dark color toner and the light color toner to improve the image quality. Actually, manufacturing errors or aging makes the developing units different in their threshold values. To cope with this, it is preferable that the number of intensity modulation levels is larger than the number of developing means.

In the FIG. 7 process, if the light color toner of Cin63, i.e., 24.7%, in color density is used, the first developing unit 5 may be switched to the second developing unit 6 not causing a large color density variation. In other words, in the color density change from Cin63 to Cin64 or Cin64 to Cin63, a color density change between the color density by the light color toner and that by the dark color toner may be made to correspond to a gradation change. If required, the output light intensity may be set in accordance with a color density of the light color toner, as a matter of course.

An implementation of the technical idea to turn on and off the light source by the utilization of the intensity modulation and the pulse width modulation will be described hereinafter.

Figure 8:
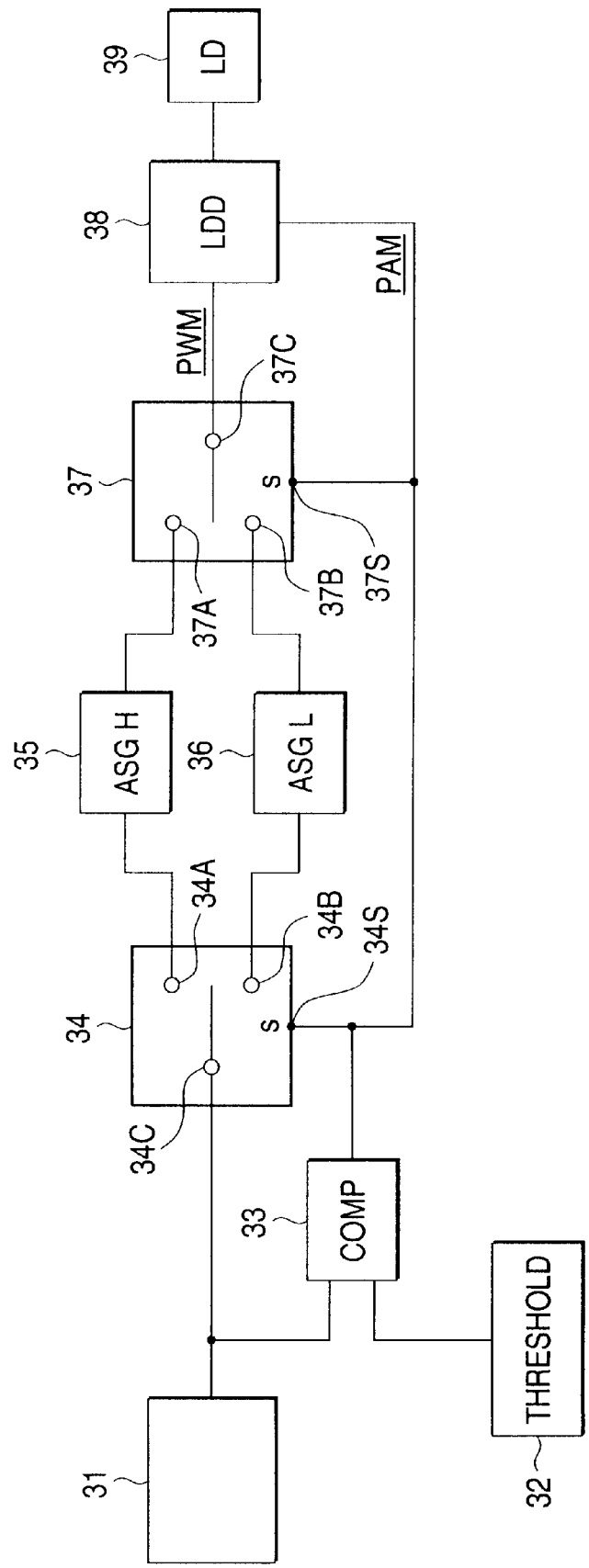
FIG. 8 is a block diagram showing a light-source drive device which drives an exposure light source by the combination of the intensity modulation and the pulse width modulation.

A light-source drive device for turning on and off a light source (semiconductor laser device) by the utilization of the intensity modulation and the pulse width modulation is illustrated in block form in FIG. 8. As shown, the light-source drive device is connected to an image output unit 31 for outputting image density data of the pixels. The image output unit 31 is connected to the comparison terminal of a comparator 33 and to a common terminal 34C of a switch 34. The reference terminal of the comparator 33 is connected to a reference-value setting portion 32. The output terminal of the comparator 33 is connected to the control terminal 34S of the switch 34, the control terminal 37S of a switch 37, and a laser drive circuit 38. The terminal 34A of the switch 34 is connected to a high optical- power screen generator (ASG-H) 35 which is connected at the output to the terminal 37A of the switch 37. The terminal 34B of the switch 34 is connected to the terminal 37B of the switch 37, through a low optical-power screen generator (ASG-L) 36. The common terminal 37C of the switch 37 is connected to a semiconductor laser device 39, through the laser drive circuit 38.

An operation of the light-source drive device will be described. Input image data of the pixels output from the image output unit 31 is input to the comparator 33. The comparator compares the input image data with an intensity select threshold value set by the reference-value setting portion 32. The switch 34 is switched in accordance with the output signal of the comparator 33. When the input image density is larger than the threshold value, the switch 34 chooses the high optical- power screen generator (ASG-H) 35. When the input image density is smaller than the threshold value, the switch 34 chooses the low optical-power screen generator (ASG-L) 36. The switch 37, like the switch 34, which is operated in accordance with the output signal of the comparator 33, is connected to the outputs of the screen generators 35 and 36. The output signal of each of the screen generators 35 and 36 is input to the laser drive circuit 38, and a light beam output from the semiconductor laser device 39 is modulated by a predetermined optical output.

Figure 9A:
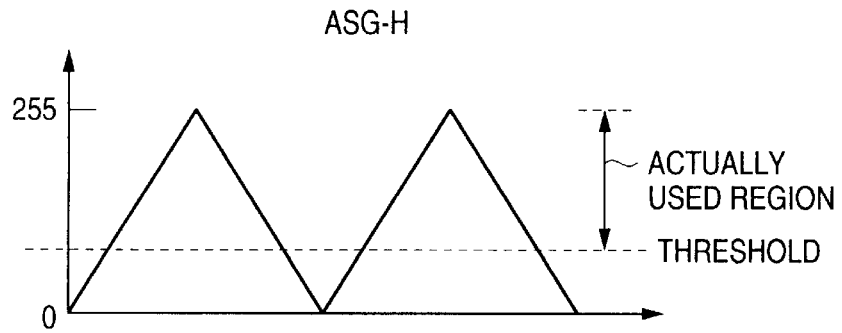
FIGS. 9A and 9B are diagram for explaining the operation principle of the screen generator.

The high optical-power screen generator (ASG-H) 35 compares the input image density data with a triangle wave signal (as a reference signal) shown in FIG. 9A, and determines the pulse width on the basis of the comparison result. The minimum value of the input image density data is 0 and set at the bottom point of the reference triangle waveform shown in FIG. 9A, and the maximum value thereof is 255 and set at the peak point of the reference triangle waveform. The image data whose density is below the threshold value causes the switch 34 to choose the low optical-power screen generator (ASG-L) 36, and therefore goes to the low optical-power screen generator 36, not to the high optical-power screen generator 35. Accordingly, the high optical-power screen generator 35 outputs a pulse width signal representative of any of values 64 to 255 of the input image density data to be developed by the dark color toner.

Figure 9B:
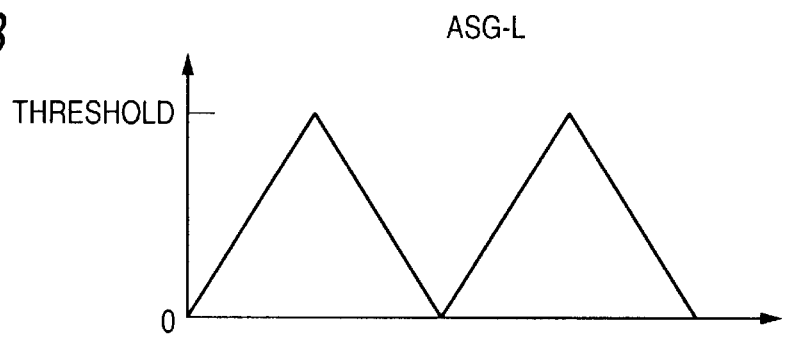

The low optical-power screen generator 36 also compares a reference triangle wave signal shown in FIG. 9B with input image density data and determines the pulse width on the basis of the comparison result. A light color toner density is set at a density value defined by a threshold value in the state that the on-time of the light beam is full (full on-time duration). The minimum value of the input image density data is 0 and set at the bottom point of the reference triangle waveform shown in FIG. 9B, and the maximum value thereof is the threshold value and set at the peak point of the reference triangle waveform. Incidentally, a signal in excess of the threshold value is not input the to low optical-power screen generator 36.

Figure 10:
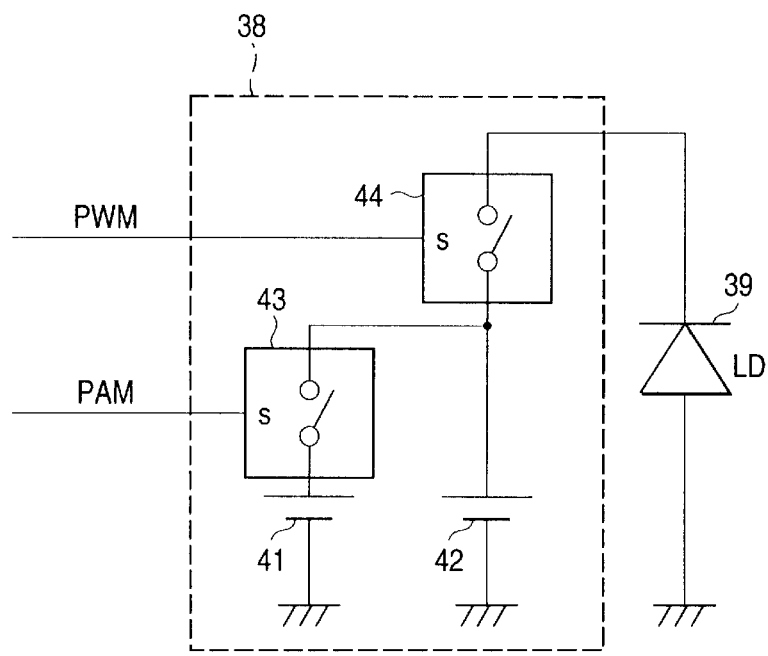
FIG. 10 is a circuit diagram showing a laser drive circuit for modulating a light beam by the combination of the intensity modulation and the pulse width modulation.

As shown in FIG. 10, an intensity select signal (PAM) derived from the comparator 33 is also input to the laser drive circuit 38, in addition to the pulse width signal derived from the high or low optical-power screen generator 35 or 36. The laser drive circuit 38 includes two power sources 41 and 42. The power source 41 is connected through a switch 43 to the plus terminal of the power source 42. The plus terminal of the power source 42 is connected through a switch 44 to the semiconductor laser device 39. The control terminal S of the switch 43 receives an intensity select signal (PAM) from the comparator 33, and the control terminal S of the switch 44 receives a pulse width signal (PWM). In the laser drive circuit 38, the switch 43 is turned on when the input image density is above the threshold value, or when the PAM signal from the comparator 33 is high in logic level (rendering the switch close), and is turned off when it is below the threshold value. In this way, the drive current of the semiconductor laser device 39 is selected. The PWM signal output from the screen generator turns on the switch 44 when the pulse width takes a predetermined value.

The light-source drive device thus constructed selects an optical output power of the exposure unit in accordance with the input image density, and can execute the FIG. 7 process based on the combination of that intensity modulation and the pulse width modulation.

Figure 11:
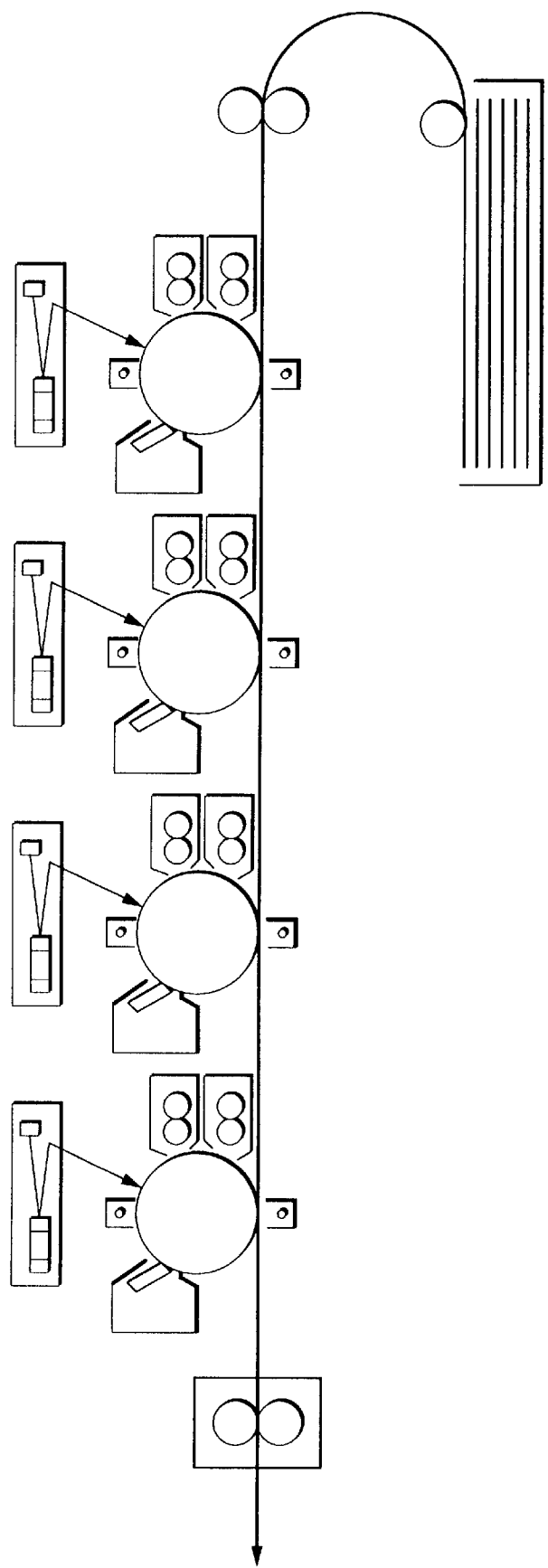
FIG. 11 is a schematic diagram showing an image forming apparatus for forming a full-color image by use of a multiple of xerography engines, which is constructed incorporating the present invention thereinto.

FIG. 11 shows an image forming apparatus for forming a full-color image by use of a multiple of xerography engines, which is constructed incorporating the present invention thereinto. As shown, four xerography engines each having the construction shown in FIG. 2 are arranged side by side. The color developers of the engines are yellow, magenta, cyan and black. Each xerography engine includes a plural number of developing units containing two kinds of color toner, light and dark colors, to improve the print quality in the low and high density portions. In the illustrated embodiment, two developing units are assembled into each of all the xerography engines. In this case, a single developing unit may be assembled into the xerography engine for yellow color because the human eyes are relatively insensitive to yellow.

While in the illustrated embodiments, the exposure unit is the laser scanner, it is evident that the invention is effectively applicable to the solid-state light emitting element array (e.g., an LED array head and an EL light emitting element array).

While the present invention has been described using the specific embodiments, the invention may be modified, altered and changed within the scope and spirit of the invention.

The embodiment of the invention is characterized in that plural kinds of color toner of different color densities are supplied to developing means, and those kinds of color toner are selected in accordance with an exposure light intensity by exposure means. Those kinds of color toner belong to the same color family but are different in color density, whereby the gradation of the half-tone image is improved.

A first mode of the invention is a digital image forming apparatus comprising at least charging means for charging a photosensitive member, exposing means for forming an electrostatic latent image including a plural number of latent-image pixels arrayed vertically and horizontally, and developing means for developing the electrostatic latent image, those means being disposed around the photosensitive member, the improvement being characterized in that at least two developing means are provided for one exposure means; and the developing is performed under the condition that the plurality of developing means require more intensive exposure energy as the developing means are located closer to the exposure means.

A second mode of the invention is the image forming apparatus of the first mode specified such the bias voltages applied to the plurality of developing means are different from one another.

A third mode of the invention is the image forming apparatus of the first or second mode specified such that the color densities of the color toner contained in the plurality of developing means are higher as the developing means are located closer to the exposure means.

A fourth mode of the invention is the image forming apparatus of the third mode specified such that the different kinds of color toner belong to the same color family but are different in the amount of coloring material contained in the base material.

A fifth mode of the invention is the image forming apparatus of any of the first to fourth-modes specified such that the exposure means forms a pulse-width modulated light spot on the photoreceptor, and the developing conditions or the spot diameter of the light spot is set such that when or before the exposure energy in the valley region in the exposure energy distribution is substantially equal to the minimum exposure energy necessary for developing process by the developing means located farther from the exposure means, the peak value in the exposure energy distribution reaches the minimum exposure energy necessary for the developing process by the developing means closer to the exposure means.

A sixth mode of the invention is the image forming apparatus of any of the first to fourth modes specified such that the exposure means includes pulse-width modulation means and intensity modulation means, and the intensity modulation means is capable of driving a light source to emit light at a intensity level that is equal to or higher than the number of the developing means.

A seventh mode of the invention is the image forming apparatus of the sixth mode specified such that a color density of the light color toner is substantially equal to an image density to switch the optical output power of the light source by the intensity modulation means.

An eighth mode of the invention is the image forming apparatus of the sixth or seventh mode specified such that the exposure means generates an intensity select signal from the density data of the pixels contained in the input image, and the intensity select signal is used for selecting one pulse width modulation signal generating means from among those generating means.

As seen from the foregoing description, the invention enables an image to be formed by use of a dark color toner and a light color toner without increasing the apparatus scale, through the xerography process. The gradation and the graininess of the resultant picture are improved.

What is claimed is:

1. A digital image forming method for forming a digital image by developing an electrostatic latent image including a plural number of latent-image pixels on a photosensitive member, said method comprising the steps of:

forming latent-image pixels by varying the potential of the latent image in accordance with image information representative of gradation levels; and developing the latent image by use of toner particles of gradation levels corresponding to the varied potentials of the latent image.

2. The digital image forming method of claim 1, wherein the latent image is formed in a manner that said photosensitive member is charged and irradiated with a light beam intensity modulated by image information.

3. The digital image forming method of claim 1, wherein in case of the developing process by use of the toner particles, the bias voltages for development are used as the voltages corresponding to the potentials of the latent image, and the bias voltages are varied for development.

4. The digital image forming method of claim 3, wherein the potentials of the latent image are within a predetermined range of potential values.

5. The digital image forming method of claim 1, wherein said toner particles are equal in color, and are different charge retaining amounts of said toner particles of different gradation levels.

6. A digital image forming apparatus comprising:

charging means for charging a photosensitive member, exposing means for forming an electrostatic latent image including a plural number of latent-image pixels arrayed vertically and horizontally, and developing means for developing the electrostatic latent image, those means being disposed around said photosensitive member, wherein said exposing means forms latent-image pixels by varying the potential of the latent image in accordance with image information representative of shading levels, and develops the latent image by use of toner particles of gradation levels corresponding to the varied potentials of the latent image.

* * * * *